June 14, 1966     K. H. MEYER ETAL     3,255,806

FLUID ACTUATED STRUCTURE

Original Filed May 20, 1963     2 Sheets-Sheet 1

INVENTORS.
KENNETH H. MEYER
WILLIAM E. HEESE
BY Watts & Fisher
ATTORNEYS.

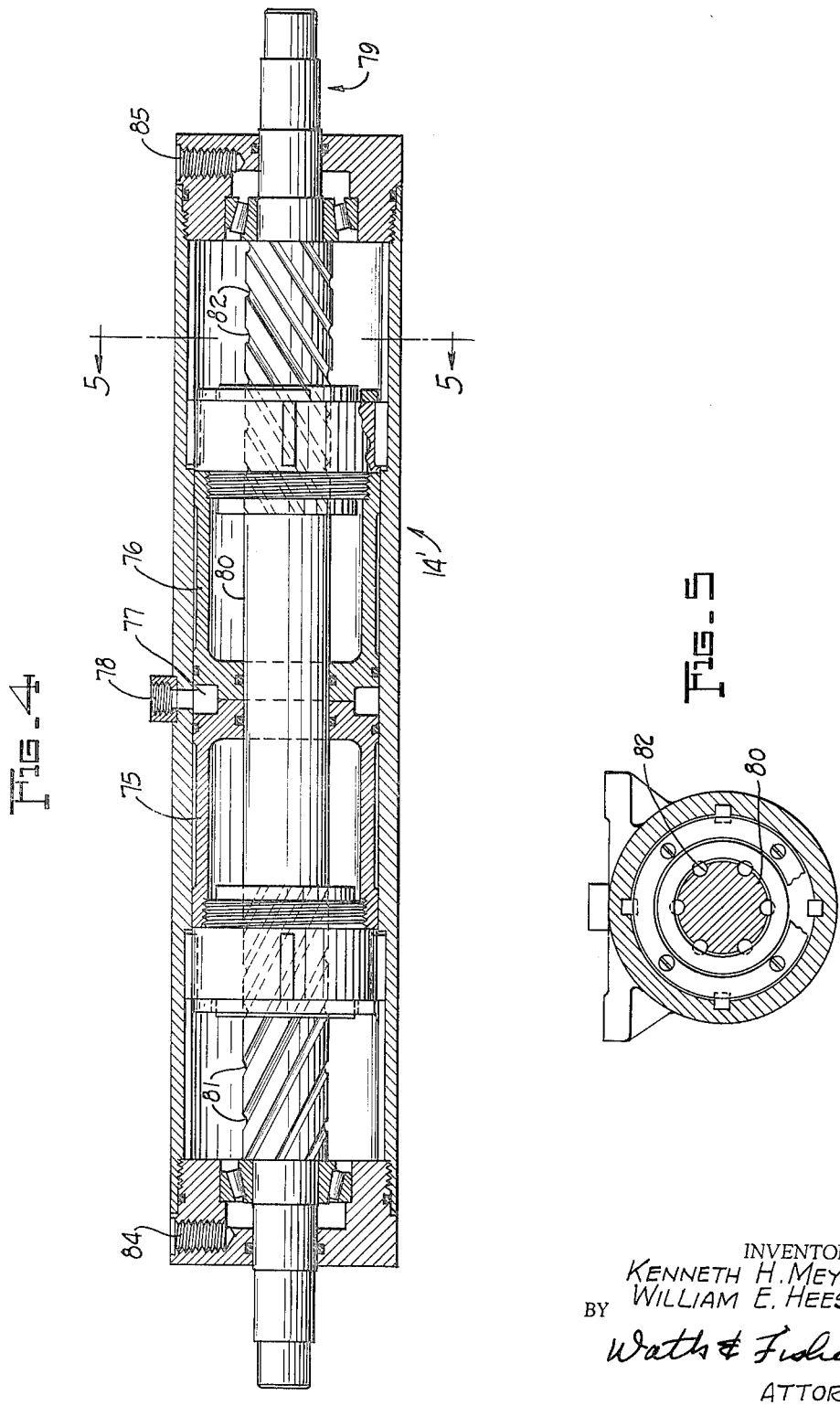

United States Patent Office 3,255,806
Patented June 14, 1966

3,255,806
FLUID ACTUATED STRUCTURE
Kenneth H. Meyer and William E. Heese, Akron, Ohio, assignors to Flo-Tork, Inc., Orrville, Ohio, a corporation of Ohio
Continuation of application Ser. No. 281,509, May 20, 1963. This application Oct. 3, 1963, Ser. No. 323,536
8 Claims. (Cl. 160—188)

This invention relates to a fluid actuated hinged structure and more particularly to a novel and improved hinged apparatus including an actuator adapted to be fluid actuated in one direction and gravity actuated in the other.

This is a continuation of Serial No. 281,509, filed May 20, 1963, by Kenneth H. Meyer and William E. Heese under the title Fluid Actuated Structure, now abandoned.

In the past, there have been a number of proposals for so-called "single acting cylinders." That is, structures in which fluid under pressure is used to drive a piston in one direction and a spring is used to return the piston. Structures in which fluid pressure is converted to rotary motion have also been proposed. The present invention is directed to a structure which incorporates features of both of these classes of proposals into a fluid actuated structure which is reversible. That is, a piston is provided which reciprocates within a housing. Fluid pressure may be utilized to cause the piston to reciprocate and thereby cause relative rotation of a shaft and the housing. The mechanism is reversible in that rotation of the shaft will cause reciprocation of the housing.

In one class of ship hatch covers, a pair of members are hingedly connected together. The actuator of this invention is used as a hinge for these two members with the housing of the actuator being connected to one member and the shaft to the other. When fluid pressure is introduced into the actuator to drive the piston and cause relative rotation of the shaft and housing, the hinged ends of the members and the actuator are caused to elevate pivoting the two members together. Suitable guides interposed between the members and the deck of the ship maintain the members oriented about the hatch as they fold together in upstanding positions to open the hatch.

With the mechanism of this invention and the particular hatch shown in the drawings, the two members are held open by fluid pressure maintained against the piston. Since the actuator is reversible, all that is required to close the hatch is to release this fluid pressure. In other applications or with hatch designs other than the pictured design, or when the ship is listing, an initial starting force will be required. This self-closing feature through the force of gravity produces one of the outstanding features of the invention.

With ships which carry perishable cargo, such as refrigerated ships, a hatch remaining in an open position in a tropical climate can result in damage and, in fact, destruction to a cargo. Similarly, if the cargo is susceptible to water damage, an open hatch in a rain storm or a heavy sea can obviously result in similar damage or destruction. Moreover, whether or not the cargo is damaged, the admission of sea water through the hatch and into the hold is undesirable.

Prior hatch proposals of a construction at all similar to the present invention were not reversible. Accordingly, failure of the hydraulic system with the hatch in an open position meant that it was impossible to close the hatch until the hydraulic system was repaired. For the reasons mentioned previously, this is obviously a very undesirable condition and it is a condition which is completely obviated by the present invention.

Ships, when in use, tend to "work." Thus, there is a considerable amount of twisting which can result in binding and the hydraulic system failing to close the hatch. The low friction construction which provides these described reversible characteristics also provides a structure which overcomes this binding.

An actuator structure which serves the dual purpose of hinge and actuator for a hatch cover must be a long, thin and compact unit. It must also be a rugged and dependable unit. It preferably has a shaft extending from both ends for connection to two hinges. Prior proposals for actuators which meet these rigid requirements have had inherent drawbacks in addition to the tendency to bind. One of these drawbacks is that the proposals have resulted in internal pockets which trapped quantities of fluid and/or tended to form a vacuum upon reciprocation of the piston. Such trapped quantities of fluid and vacuums act against the piston depriving it of its full power. With the present invention this disadvantage is overcome in an actuator which meets all of the previously listed criterions for a hinge actuator and in addition, has a piston assembly in which the total transverse area exposed to a pressure chamber on one side of the piston is substantially equal to the area exposed to the other side of the piston so that fluid readily moves in and out of the chamber on either side of the piston without either creation of vacuum or trapping of fluid. This can be quite important because with a ship listing or heeling the force required to start closing of the hatch can approach that required to open it.

With the present actuator one side of the piston may be vented to the atmosphere and the other side supplied with fluid power so that it is the power side in those applications where no additional force is required on the return stroke. Since, in such an application, the return force is the force of gravity, no return mechanism is required. Since no return mechanism is required, there is no resistance of a return mechanism which must be overcome as the device is driven in an opening direction and, therefore, the entire assembly has improved efficiency over prior devices.

Another feature of the present invention which improves its efficiency is the low friction construction which permits the device to be gravity returned to a closed position. One of the principal contributing factors to this low friction is the use of a ball nut to drive the shaft and produce the relative rotation of the shaft and the housing. Another feature contributing to this efficiency is the use of roller-type bearings and the use of the actuation fluid to lubricate both the ball nut and the bearings.

A further feature of the invention resides in a construction in which the fluid pressure is introduced through ports in the end cap and the fluid passes through bearings journaling the shaft as the fluid drives the piston or as it is exhausted on the return stroke. This structure contributes to both the compactness and ruggedness of the unit and also to the low friction efficiency of it.

An additional feature of the invention resides in a construction which permits simplified assemblying and conversely simplified dismantling for repair or servicing.

Accordingly, the objects of this invention are:

(1) To provide a novel and improved hinged structure in which the hinging of two members is provided by a hinge-actuator capable of being driven in one direction by fluid under pressure and in the other by gravity; and, (2) A novel and improved fluid actuator.

Other objects and a fuller understanding of the invention may be had by referring to the following description and claims taken in conjunction with the accompanying drawings in which:

In the drawings:

FIGURE 1 is a schematic view of a ship hatch shown in solid lines in the open position and in phantom lines in the closed position;

FIGURE 2 is a sectional view of one form of the hinge actuator of this invention;

FIGURE 3 is a sectional view of the structure of FIGURE 2 as seen from a plane indicated by the line 3—3 of FIGURE 2;

FIGURE 4 is a sectional view of a two-piston hinge actuator constructed according to this invention; and, FIGURE 5 is an enlarged fragmentary sectional view showing the piston, ball nut, and adapter ring.

Referring now to the drawings and FIGURE 1 in particular, a ship hatch is shown schematically at 10. A pivoted hatch member 11 is pivotally connected to the deck of the ship at 12. A tracking hatch member 13 is hingedly connected to the pivoted member 11 by a hinge actuator shown generally at 14. Guide wheels 15 are secured to the tracking member 13 near an edge remote from the hinge actuator 14. The guide wheels 15 roll on suitable guide tracks 17 provided at the edge of the hatch 10.

In a hatch cover of the type shown schematically in FIGURE 1, a complete cover for the hatch 10 is provided by the two cover members 11, 13. When the hatch is moved from its closed position shown in phantom to its solid line open position, the hinge actuator 14 is operated. Since the end of the pivoted cover member 11 connected by the pivot 12 cannot move horizontally, actuation of the hinge actuator swings the two cover members together and causes the guide wheels 15 to travel along the tracks 17 until the hatch is in the open position.

The tracks 17 may include inclined ramp portions 18 near the ends adjacent the pivots 12. When the fluid pressure supplied to the hinge actuator is released, these ramps 18 will assist the hatch in its initial closing movement and the weight of the cover members will cause the hatch to close.

It should be noted that it is possible, and in fact in some applications preferable, even though more torque is required, to place the hinge actuator 14 along the axis of the pivot 12 to serve as the pivot. Another hinge is then provided in place of the hinge actuator between the cover members. The operation and functioning are similar and the structure is preferable from the standpoint that one is not required to either:

(1) use flexible tubing; or, (2) provide a hydraulic power unit that is secured to the hatch. This is true because the actuator housing will remain in a fixed position.

FIGURES 2 and 3 are sectional views of the hinge actuator 14. The hinge actuator 14 includes an elongated tubular housing body 20. Near the left hand end as seen in FIGURE 2, the housing has cylindrically contoured smooth internal walls 21 which define a fluid pressure section 19 of a fluid chamber. To the right of the fluid pressure section 19, longitudinally extending key grooves 22 are formed in the innerwall of the tube 20. These key grooves 22 parallel the axis of the body 20. The section within the body and to the right of the pressure section may be identified as a rotation producing section. The rotation producing section has a length which is defined by and identical to the length of the key grooves 22.

The body 20 has cylindrically contoured sealing surfaces 23, 24, adjacent its respective ends. The sealing surfaces 23, 24, extend axially inwardly from their respective ends of the body 20 to cap locating shoulders 25, 26, respectively. The shoulders extend radially inwardly to cap connecting threaded portions 27, 28, respectively. The threaded portions 27, 28, are formed in the opposite ends of the cylindrically contoured internal surfaces of the body 20 which define the fluid chamber.

A pair of annular end caps 30, 31, are telescoped respectively into the left and right hand ends of the body 20, as viewed in FIGURE 2 to complete a housing. The caps 30, 31, are in threaded engagement with the threaded portions 27, 28, respectively and retained there by suitable deformable locking inserts 32, only one of which is shown in FIGURE 1. The caps 30, 31, have shoulders 34, 35, respectively abutting the radially disposed body shoulders 25, 26. O-ring seals 36, 37, are carried by the caps 30, 31, and in sealing engagement with the body sealing portions 23, 24, respectively.

The O-ring seal 37 and the sealing portion 24 are positioned adjacent the right hand end of the housing, as viewed in FIGURE 1, for a novel purpose which assists in the manufacture of a compact actuator. With this construction the key grooves 22 may be milled from the right hand end of the body inwardly as far as desired. The sealing portion 24 is formed of a diameter slightly larger than the depth of the grooves to provide a smooth cylindrically contoured surface. It is formed outwardly from the grooves so that one may mill the grooves from the end of the body inwardly. The construction at the left hand end of the body is made identical to the right hand end to permit the use of interchangeable end caps.

The annular end caps 30, 31, have through bores of stepped construction. Since the caps are identical and interchangeable, for convenience only, the left hand caps will be described in detail. Adjacent the outer end of the cap a small diameter shaft sealing portion of the bore is provided at 40. A somewhat larger but intermediate diameter portion which serves as a fluid reservoir is provided at 41. The largest diameter portion of the bore is at 42 and extends inwardly from the reservoir portion 41 to the inner end of the cap. The largest diameter portion 42 receives a pair of ball bearings 43 for journaling a through shaft 44. An O-ring seal 45 is carried by the cap 30 in the sealing portion 40 of the through bore to effect a seal between the cap 30 and the shaft 44. The cap 30 includes a radially disposed port 46 which communicates with the pressure for conducting fluid to and from the interior of the actuator or for serving as a vent on the return side of the actuator.

As indicated previously the caps 30 and 31 are identical in construction. Accordingly, parts of the cap 31 corresponding to those described in connection with the cap 30 are indicated by the same number with a prime added. Thus, the shaft sealing portion of the bore of the cap 31 is designated at 40' and the reservoir portion as 41'.

The shaft 44 has a cylindrically contoured sealing portion 50 and a rotation producing portion 51. The rotation producing portion 51 is equipped with a plurality of spiral ball engaging grooves 52. A piston shown generally at 53 is provided. The piston includes a radially disposed pressure wall 54 which fills the space between the shaft sealing portion 50 and the body sealing portion 21. The wall 54 carries shaft and body O-rings 55, 56, which effect seals between the wall 54 and the shaft and body respectively.

A tubular ball nut 58 surrounds the shaft rotation producing portion 51. The ball nut 58 has balls 57, FIGURE 2, in rolling engagement with the spiral grooves 52 so that reciprocation of the ball nut 58 will cause rotation of the shaft 44 and vice versa. An annular ring adapter 59 surrounds and is threadedly fixed to the nut 58.

The piston 53 includes an elongated tubular skirt portion 60. The adapter ring 59 has a reduced diameter threaded portion 61 which is threaded into the skirt 60. The ring 59 has a radially extending shoulder 62 which extends radially outwardly from the threaded portion 61 terminating at a cylindrical external surface 63 of a diameter equal to the outside diameter of the skirt 60. The end of the skirt abuts the ring shoulder 62 to effect a locking action on the threaded connection between the ring and the skirt 59, 60. Additionally, an elastic locking member 64 is preferably interposed between the skirt and the threaded portion 61 to assure a rigid connection between the piston and the ring.

The skirt 60 extends from its threaded connection with the adapter ring 59 to the left to an integral connection with the wall portion 54 so that movement of the wall portion 54 will cause reciprocation of the ball nut 58 and vice versa. A plurality of keys 65 are carried by the adapter ring in circumferentially spaced grooves 66 formed in the cylindrical surface 63. The keys 65 are held against reciprocation relative to the adapter ring 59 by an overlying end ring 68 fixed to the adapter ring 59. In the preferred and disclosed arrangement, there are four keys 65 spaced 90° with respect to one another each projecting into a different one of four key grooves 22. The keys 65 are slidably disposed in the key grooves 22 so that relative rotation of the piston 60 and the body 20 are prevented while relative reciprocation is permitted.

It will be apparent that the selective introduction of fluid under pressure through a selected one of the ports 46, 46', will cause a piston assembly composed of the piston 53, the ball nut 58, the ring adapter 59, and the keys 65 to reciprocate. This in turn will cause relative rotation of the housing and shaft. One of the outstanding features of this invention resides in the fact that the novel construction is sufficiently low friction to permit the reverse to be true. That is, forces causing rotation of the shaft and housing will cause the piston to move axially expelling fluid from the chamber providing, of course, supply pressure has been released.

In one application where no initial closing force is required of the device as a hinge actuator, the port 46 in the end cap 30 will serve as a vent. Fluid under pressure is selectively introduced through the port 46' in the end cap 31. The port 46' is preferably used so that the ball nut 58 and the bearings 43' are constantly immersed in the actuating fluid for lubrication. The construction of the device is such that even when the piston is at either extreme of its travel, the nut 58 and bearings 43' will be fully immersed in the hydraulic oil. Moreover, the relative movement of the device and the forcing of the oil through the bearings 43' agitates the oil and assures thorough and proper lubrication.

When the port 46 is used as a vent, some oil may be maintained in the left hand end of the chamber. Thus, when the piston is at the left hand end of its stroke, the normally closed position of the hatch, the bearings 43 will be immersed. If desired, a reservoir of oil may be attached to the port 46 to maintain the bearings 43 immersed at all times.

It should be noted that even when, as in the preferred hatch shown, the port 46 does not serve as a vent, the reversible nature of the actuator is still an advantage. Upon hydraulic failure the hatch cover, or other structure connected to the actuator, can move under the force of gravity to a desired and safe condition such as with the hatch closed, once an initial starting force, if required, is applied.

When the piston 53 is at the left hand end of its travel, the ball nut 58 is longitudinally centered in the housing body 20. From this it will be apparent that the rotation producing section of the body is longer than the sealing section by about the axial length of the keys 65 to accommodate travel of the ball nut from this longitudinally centered position until it reaches the right hand end of its travel. The cylindrically contoured body and shaft sealing section surfaces 21, 50, are of sufficient axial length so that the piston seals 55, 56, are in sealing engagement with these surfaces at all times during the piston's reciprocation.

The description of the operation of the actuator, which has been set out above, will make it apparent that the space between the skirt 60 and the shaft 44 is at all times filled with the hydraulic fluid. Once this space has become filled with fluid, it will remain so and there is no opportunity for air to be entrapped in the space. To enhance the removal of air at the time when the device is first put in use, the skirt 60 may be equipped with one or more radial holes 70, FIGURE 2. Even though the construction of the unit is such that a generally cup-shaped piston is used which extends at all times from the sealing section into the rotation producing section, the total cross-sectional area of the piston assembly exposed to fluid pressures on the right hand side of the device is substantially equal to the area on the left hand side and the actuator is free of pockets which might trap air or cause the creation of a partial vacuum.

The housing body has mounting flanges 71, FIGURES 2 and 3, wihch are connected to the pivoted hatch member 11. The shaft 44 is suitably fixed to hinge brackets 72, FIGURE 1, outwardly of the end caps 30, 31. When the actuator is in the position shown in FIGURE 2, the hatch will be in its solid line position of FIGURE 1. When the pressure on the fluid to the right of the piston assembly is released and slight initial pressure is applied, gravity will cause the hatch to close, shifting the piston to the right and exhausting fluid through the port 46'.

In the arrangement of FIGURE 4, an actuator 14' has a pair of oppositely opposed pistons 75, 76. The construction of the pistons is identical to the construction of FIGURES 2 and 4 with the exception that an annular pressure receiving recess 77 is defined by the two pistons at the longitudinal center of the actuator so that fluid under pressure introduced through the inlet port 78 at the center of the actuator will act against the pistons 75, 76, to drive them in opposite directions.

A shaft 79 is provided which has a central cylindrically contoured sealing portion 80. Oppositely spiraled ball grooves 81, 82, are provided on opposite sides of the sealing portion 80. Reciprocation of the pistons 75, 76, toward and away from one another will act against the shaft in a balanced fashion to cause shaft rotation while limiting twisting forces applied to the hinged members. The balanced application of force as obtained with the FIGURE 4 embodiment can be obtained with the device of FIGURE 2 if two units are used. Here two units will be oriented opposite one another and connected to a single hinge such that they are mirror images of one another on opposite sides of the hinge. The pistons are driven in the same direction so that rotation in the oppositely oriented units is in the same direction. Conversely, rotation of the shaft will cause opposite reciprocation of the pistons. The use of two actuators of the construction of FIGURE 2 is preferred over the construction of FIGURE 4 in many hatches, especially relatively heavy hatches. This is true because the shorter shafts of the FIGURE 2 construction twist less than those of FIGURE 4 and are, therefore, less susceptible to binding and the like.

The version of FIGURE 4 has another advantage in that if port 78 is used as a vent and fluid under pressure is introduced through spaced ports 84, 85, the bearings and ball nuts are maintained immersed in fluid at all times.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A fluid actuator comprising:
(a) an elongated tubular housing body having internal cylindrically contoured walls defining an open ended fluid chamber, said chamber having a rotation producing section extending from one end toward the other and the remainder of the chamber being a fluid sealing section, said housing body having a longitudinally extending groove extending the length of said rotation producing section;
(b) first and second annular end caps telescoped into the ends of the housing body and fixed to the hous- ing body to complete a housing, said caps closing the ends of the fluid chamber;

(c) an elongated shaft extending axially through the chamber in spaced relationship with said walls and projecting through both of said end caps, said shaft having a cylindrically contoured fluid sealing section disposed within the housing fluid sealing section and a spirally grooved rotation producing section disposed within the housing rotation producing section;

(d) a piston having an annular pressure receiving wall portion disposed between and filling the space between the fluid sealing sections;

(e) annular fluid seals carried by said pressure portion and interposed between the piston and the body and shaft fluid sealing sections respectively;

(f) said piston having an elongated nut connecting skirt portion extending from the fluid seal portion of the piston toward the rotation producing section of the body;

(g) a ball nut secured to the skirt portion and circumscribing the rotation producing section of the shaft, said ball nut including balls in driving engagement with said spiral grooves to cause rotation of the shaft relative to the piston on reciprocation of the piston;

(h) key means connected to the piston and projecting into said longitudinally extending body grooves to prevent rotation of the piston relative to the housing while permitting reciprocation of the piston;

(i) said piston and nut together forming a piston assembly;

(j) said housing including ports communicating with the chamber on opposite sides of said assembly;

(k) said assembly having substantially equal total transverse areas exposed to the chamber on each side of the piston whereby torque produced in opposite directions is substantially equal; and, (l) said actuator being reversible whereby reciprocation of the piston assembly will cause relative rotation of the housing and shaft and relative rotation of the shaft and housing will cause reciprocation of the piston assembly.

2. The device of claim 1 wherein the piston assembly includes an adapter ring and wherein:

(a) the adapter ring surrounds and is fixed to the ball nut;

(b) the skirt portion is fixed to the ring;

(c) the ring has a key retaining groove; and, (d) the key means is a key carried by the ring in its groove and slidably disposed in the body groove.

3. The device of claim 2 wherein the ring is threadedly fixed to both the nut and the skirt and the skirt is tubular.

4. The device of claim 1 wherein:

(a) the shaft is journaled in bearings carried by the end caps and positioned in the chamber; and (b) the ports are in the end caps outwardly of the bearings such that fluid introduced into the chamber to actuate the piston passes through bearings for forced lubrication.

5. In combination with the device of claim 1, a pair of relatively movable plates, one of said plates being connected to said housing body and the other of said plates being connected to said shaft whereby said actuator forms a hinge for said plates.

6. A fluid actuator comprising:

(a) an elongated tubular housing body defining an internal open ended actuation chamber;

(b) end caps fixed to the body and closing the ends of the chamber;

(c) bearings carried by the caps in said chamber;

(d) a shaft journaled in bearings and extending through the chamber, the shaft projecting through the end caps;

(e) a reciprocal piston means around the shaft and connected to the body and shaft for causing relative rotation of the shaft and body and piston reciprocation to occur simultaneously;

(f) each cap including a fluid port outwardly of the bearing carried by the cap and communicating with the chamber through the bearing carried by the cap;

(g) fluid means connected to a port for selectively introducing fluid under pressure through the port and thence through one of the bearings into the chamber to drive the piston.

7. A fluid actuator comprising:

(a) an elongated tubular housing body having internal cylindrically contoured walls defining an open ended fluid chamber, said chamber having a rotation producing section extending from one end toward the other and the remainder of the chamber being a fluid sealing section;

(b) said housing body having circumferentially spaced longitudinally extending grooves extending the length of said rotation producing section, said grooves being parallel to the axis of the chamber and of an axial length greater than the fluid sealing section;

(c) first and second annular end caps threaded into the ends of the housing body and fixed to the housing body to complete a housing, said caps closing the ends of the fluid chamber and each having a radially disposed shoulder abutting an end of the body;

(d) rotating element bearings carried by the end caps in the chamber;

(e) an elongated shaft extending through the chamber in spaced relationship with said walls and projecting through both of said end caps, the shaft being journaled in the bearings, said shaft having a cylindrically contoured fluid sealing section disposed coaxially within the housing fluid sealing section and of a corresponding length, the shaft having a spirally grooved rotation producing section disposed coaxially within the housing rotation producing section and of corresponding length;

(f) a piston having an annular pressure receiving wall portion disposed between and in sliding sealing engagement with both of the fluid sealing sections;

(g) O-ring seals carried by said pressure portion and interposed between the piston and the body and shaft fluid sealing sections respectively;

(h) said piston having an elongated, tubular, nut connecting, skirt extending from the wall portion of the piston into the rotation producing section of the body;

(i) an annular ball nut circumscribing the rotation producing section of the shaft, said ball nut including balls in driving engagement with said spiral grooves to cause rotation of the shaft relative to the piston on reciprocation of the piston;

(j) an adapter ring surrounding the nut and threadedly fixed to the nut and the skirt; the ring including a plurality of circumferentially spaced grooves, there being a like number of ring and body grooves;

(k) a plurality of keys each carried in a different one of the ring grooves, each key projecting into a different one of said longitudinally extending body grooves and disposed slidably therein preventing rotation of the piston relative to the housing while permitting reciprocation of the piston;

(l) said piston, nut, and ring together forming a piston assembly;

(m) said housing including ports communicating with the chamber on opposite sides of said assembly;

(n) said assembly having substantially equal total transverse areas exposed to the chamber on each side of the piston whereby torque produced in opposite directions is substantially equal; and (o) said actuator being reversible whereby reciprocation of the piston assembly will cause relative rotation of the housing and shaft and relative rotation of the shaft and housing will cause reciprocation of the piston assembly.

8. A fluid actuator comprising:
(a) an elongated housing defining an internal actuation chamber;
(b) bearings carried by the housing within said chamber and near the ends thereof;
(c) a shaft journaled in bearings and extending through the chamber, the shaft projecting outwardly of the housing;
(d) a reciprocal piston around the shaft and including means connected to the body and shaft for causing relative rotation of the shaft and body and piston reciprocation to occur simultaneously;
(e) said housing including a fluid port outwardly of one of said bearings and communicating with the chamber through said one of the bearings; and
(f) fluid means connected to a port for selectively introducing fluid under pressure through the port and thence through said one of the bearings into the chamber to drive the piston.

References Cited by the Examiner
UNITED STATES PATENTS

| | | | |
|---|---|---|---|
| 2,484,286 | 10/1949 | Groppell | 160—188 X |
| 2,705,592 | 4/1955 | Reiser | 92—33 X |
| 3,056,386 | 10/1962 | Aarvold et al. | 92—33 |

HARRISON R. MOSELEY, *Primary Examiner.*

P. M. CAUN, *Examiner.*